US006691915B1

United States Patent
Thaxton et al.

(12) United States Patent
(10) Patent No.: US 6,691,915 B1
(45) Date of Patent: Feb. 17, 2004

(54) ELECTRONIC COUPON SYSTEM AND METHOD OF PROCESSING ELECTRONIC COUPON CARD FOR STORAGE AND REDEMPTION

(75) Inventors: Daniel David Thaxton, New Lebanon, OH (US); Loren C. Schafer, Dayton, OH (US); Martin H. Hileman, Dayton, OH (US)

(73) Assignee: The Standard Register Company, Dayton, OH (US)

( * ) Notice: Subject to any disclaimer, the term of this patent is extended or adjusted under 35 U.S.C. 154(b) by 677 days.

(21) Appl. No.: 09/192,842

(22) Filed: Nov. 16, 1998

(51) Int. Cl.⁷ .................................................. G06K 5/00
(52) U.S. Cl. ........................................ 235/380; 705/14
(58) Field of Search ................................. 235/380, 375, 235/383, 385; 705/14, 16, 26, 27

(56) References Cited

U.S. PATENT DOCUMENTS

| | | | |
|---|---|---|---|
| 4,674,041 A | | 6/1987 | Lemon et al. .............. 364/401 |
| 4,703,423 A | * | 10/1987 | Bado et al. ................. 364/400 |
| 4,882,675 A | * | 11/1989 | Nichtberger et al. .......... 705/14 |
| 5,047,614 A | * | 9/1991 | Bianco ....................... 235/385 |
| 5,185,695 A | | 2/1993 | Pruchnicki ................. 364/401 |
| 5,192,854 A | | 3/1993 | Counts ....................... 235/375 |
| 5,285,278 A | | 2/1994 | Holman ..................... 358/142 |
| 5,287,181 A | | 2/1994 | Holman ..................... 348/473 |
| 5,305,197 A | * | 4/1994 | Axler et al. ................ 364/401 |
| 5,380,991 A | | 1/1995 | Valencia et al. ............ 235/383 |
| RE34,915 E | | 4/1995 | Nichtberger et al. ......... 364/401 |
| 5,420,606 A | | 5/1995 | Begum et al. .............. 345/156 |
| 5,708,782 A | * | 1/1998 | Larson et al. .............. 395/214 |
| 5,710,886 A | * | 1/1998 | Christensen et al. ........ 395/214 |
| 5,710,887 A | * | 1/1998 | Chelliah et al. ............ 395/226 |
| 5,857,175 A | * | 1/1999 | Day et al. ..................... 705/14 |
| 5,875,110 A | * | 2/1999 | Jacobs .................... 235/381 X |
| 5,956,694 A | * | 9/1999 | Powell ......................... 705/14 |
| 5,979,757 A | * | 11/1999 | Tracy et al. ................. 235/383 |
| 6,012,635 A | * | 1/2000 | Shimada et al. ............. 235/380 |
| 6,014,634 A | * | 1/2000 | Scroggie et al. .............. 705/14 |
| 6,032,130 A | * | 2/2000 | Alloul et al. ................. 705/27 |
| 6,041,309 A | * | 3/2000 | Laor ........................... 705/14 |

FOREIGN PATENT DOCUMENTS

WO    WO 98/34458    8/1998

OTHER PUBLICATIONS

Cliff Wilke, "Smart Cards, Seizing Strategic Business Opportunities" © 1997, pps. 209–223.

* cited by examiner

Primary Examiner—Diane I. Lee
(74) Attorney, Agent, or Firm—Dinsmore & Shohl LLP

(57) ABSTRACT

An electronic coupon system and a method of processing electronic coupons are provided utilizing a coupon card on which data representing selected coupons may be stored for subsequent redemption at a point-of-sale terminal. In accordance with one embodiment of the present invention, an electronic coupon system is provided including, a coupon card, an in-store kiosk, a point-of-sale terminal, a host computer, and a coupon data processor. The host computer is in communication with the in-store kiosk and the point-of-sale terminal. The in-store kiosk includes a user interface and a coupon card interface. The point-of-sale terminal includes a transaction data interface and a point-of-sale coupon card interface. The coupon data processor is programmed to correlate the transaction data with the coupon data read from the coupon card by the coupon card interface and to reduce the product sale price by an amount indicated in the coupon data.

5 Claims, 2 Drawing Sheets

ELECTRONIC COUPON SYSTEM AND METHOD OF PROCESSING ELECTRONIC COUPON CARD FOR STORAGE AND REDEMPTION

BACKGROUND OF THE INVENTION

The present invention relates to an electronic coupon system and, more particularly, to an electronic coupon system utilizing a coupon card on which data representing selected coupons may be stored for subsequent redemption at a point-of-sale terminal.

Coupons and discount vouchers are issued by manufacturers and resellers for a number of reasons. A coupon has the potential to increase consumer awareness of a product or manufacturer, motivate a consumer to purchase a particular product, reduce product inventory, and increase customer loyalty to the product or manufacturer. Most coupons are printed paper products that are widely distributed through a variety of media. Although coupons are most often distributed in local newspapers, it is also common to print coupons directly on product packaging and to utilize direct mailing methods to distribute coupons to consumers in a specific demographic group. Print coupons reach a large number of people and are effective in introducing some new products and in motivating consumers to purchase a product. However, print coupons typically have a low return rate. Further, print coupons are difficult to handle for all parties involved—the consumer, the retailer, and the manufacturer. Finally, print coupons generate minimal information regarding the demographics of the consumer redeeming the coupon. Accordingly, although there are a number of advantages in utilizing a print coupon, their functionality is limited in many respects and there is a need in the industry for a coupon issue, selection, and redemption system that increases the functionality of a coupon.

BRIEF SUMMARY OF THE INVENTION

This need is met by the present invention wherein an electronic coupon system and a method of processing electronic coupons are provided utilizing: a coupon card on which data representing selected coupons may be stored for subsequent redemption at a point-of-sale terminal.

In accordance with one embodiment of the present invention, an electronic coupon system is provided comprising a coupon card, an in-store kiosk, a point-of-sale terminal, a host computer, and a coupon data processor. The host computer is in communication with the in-store kiosk and the point-of-sale terminal.

The in-store kiosk includes a user interface and a coupon card interface. The user interface includes coupon selection instrumentation operative to prompt entry of coupon selection data at the user interface and to record the coupon selection data. The coupon card interface includes coupon card writing instrumentation operative to write coupon data to the coupon card according to the coupon selection data and coupon card reading instrumentation operative to read coupon data written to the coupon card.

The point-of-sale terminal includes a transaction data interface and a point-of-sale coupon card interface. The transaction data interface is operative to permit entry of transaction data representative of a product sale and a product sale price. The point-of-sale coupon card interface includes coupon card reading instrumentation operative to read coupon data written to the coupon card and coupon card writing instrumentation operative to remove coupon data from the coupon card according to the transaction The coupon data processor is programmed to correlate the transaction data with the coupon data read from the coupon card by the coupon card interface and to reduce the product sale price by an amount indicated in the coupon data. The step of reducing the product sale price may be dependent upon receipt of a consumer authorization signal at the point-of-sale terminal.

The coupon card may include a microprocessor embedded therein and the microprocessor may be programmed to store the coupon data in the coupon card. The coupon card may include an account identifier and the coupon data processor may be programmed to record the coupon selection data written to the coupon card associated with the account identifier.

The in-store kiosk user interface may include coupon display instrumentation operative to display available coupon data and the electronic coupon system may further comprise product filter instrumentation operative to enable inclusion or exclusion, in response to entry of inclusion or exclusion data at the user interface, of one or more selected categories of the available coupon data for display at the user interface.

The electronic coupon system may further comprise a graphical coupon data storage, wherein the in-store kiosk further includes a kiosk printer, and wherein the coupon data processor is operative to correlate the graphical coupon data with the coupon selection data and to transmit the correlated data to the kiosk printer to enable printing of a graphical coupon selected at the kiosk user interface.

The electronic coupon system may comprise a report generator programmed to generate a products-of-interest report, wherein the products-of-interest report lists products identified in coupons selected at the user interface but not identified in the transaction data. Further, the electronic coupon system may comprise a report generator programmed to generate a coupons-to-expire report, wherein the coupons-to-expire report lists coupons from coupon data written to the coupon card set to expire by a predetermined date, and wherein the coupon data processor is programmed to display the coupons-to-expire report at the user interface. Finally, the report generator may be further programmed to generate a product tracking report that enables monitoring of coupons selected at said in-store kiosk and actually redeemed at said point of sale.

The coupon data processor may be programmed to display an attention screen at the user interface, wherein the attention screen is indicative of a product promotion. The coupon data processor may be programmed to display a list of selected coupons and cause the list of selected coupons to be printed at the user interface.

In accordance with another embodiment of the present invention, a method of processing electronic coupons is provided comprising the steps of: issuing a coupon card to a selected user and providing an in-store kiosk, a point-of-sale terminal, a host computer, and a coupon data processor. The in-store kiosk includes a user interface and a coupon card interface. The point-of-sale terminal includes a transaction data interface and a point-of-sale coupon card interface. The host computer is in communication with the in-store kiosk and the point-of-sale terminal. The coupon data processor is programmed to correlate the transaction data with the coupon data read from the coupon card by the coupon card interface and to reduce the product sale price by an amount indicated in the coupon data.

In accordance with yet another embodiment of the present invention, a method of processing electronic coupons is provided comprising the steps of: inputting coupon selection data generated at an in-store kiosk; storing the coupon selection data on a coupon card at the in-store kiosk; inputting transaction data generated at a point-of-sale terminal, wherein the transaction data is representative of a product sale and a product sale price; reading coupon data written to the coupon card at the point-of-sale terminal; correlating the transaction data with the coupon data read from the coupon card; removing coupon data from the coupon card at the point-of-sale terminal according to the transaction data; and reducing the product sale price by an amount indicated in the coupon data. The steps of storing and reading the coupon selection data are preferably executed via a microprocessor embedded in the coupon card, wherein the microprocessor is programmed to store coupon data in the coupon card.

The method may further comprise the steps of: inputting product inclusion data generated at the in-store kiosk and displaying one or more selected categories of available coupon data at the in-store kiosk in response to the product inclusion data; or inputting product exclusion data generated at the in-store kiosk and displaying one or more selected categories of available coupon data at the in-store kiosk in response to the product exclusion data. Graphical coupon data may be stored and correlated with the coupon selection data to enable printing of a graphical coupon based upon the correlation of the graphical coupon data with the coupon selection data.

A products-of-interest report may be generated, listing products identified in the coupon selection data but not identified in the transaction data. A coupons-to-expire report may be generated, listing products identified in coupon data written to the coupon card and set to expire by a predetermined date. The coupons-to-expire report may be displayed at the in-store kiosk. A product tracking report may also be generated to enable monitoring of coupons selected at said in-store kiosk and actually redeemed at said point of sale.

Accordingly, it is an object of the present invention to provide an electronic coupon system that functions as an effective improvement to existing printed coupon schemes and that incorporates structural and functional features not previously contemplated in traditional coupon systems. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

The FIG. 1 is a block diagram of an electronic coupon system according to the present invention.

DETAILED DESCRIPTION OF THE PREFERRED EMBODIMENTS

Figure 1:
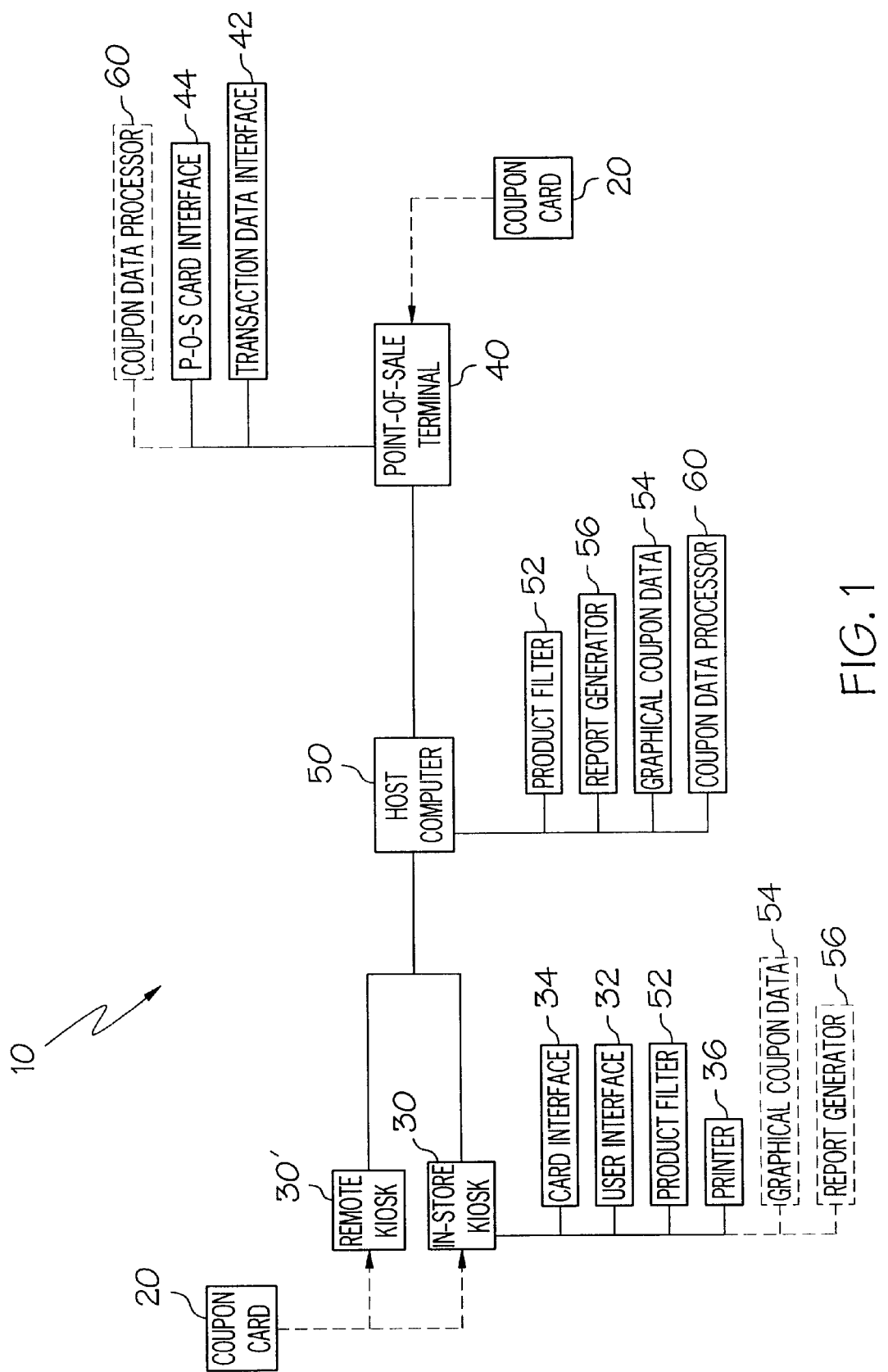

An electronic coupon system 10 according to the present invention is illustrated in FIG. 1. The electronic coupon system 10 comprises a coupon card 20, an in-store kiosk 30, a remote kiosk 30', a point-of-sale terminal 40, a host computer 50, and a coupon data processor 60. The in-store kiosk 30 includes a user interface 32 including coupon selection instrumentation, e.g., a display and keypad or a touch screen. The coupon selection instrumentation is operative to prompt entry of coupon selection data at the user interface 32 and to record the coupon selection data. The in-store kiosk 30 also includes a coupon card interface 34 including coupon card reading and writing instrumentation, e.g., a smart card reader/programmer. The coupon card interface 34 is operative to write coupon data to the coupon card 20 according to the coupon selection data and to read coupon data written to the coupon card 20. In a typical electronic coupon system 10, a plurality of in-store kiosks 30 will be provided across a network of participating retail stores. Further, a variety of remote kiosks 30', not necessarily limited to in-store locations, may be provided throughout the electronic coupon system 10.

According to a preferred embodiment of the present invention, the coupon card 20 comprises a smart card. Specifically, to enable the storage and retrieval of data to and from the coupon card 20, a microprocessor is embedded in the card 20 and is programmed to store coupon data in a memory in the coupon card 20. The coupon card 20 includes an account identifier encoded therein and the coupon data processor 60 is programmed to record coupon selection data written to the coupon card associated with the account identifier. It is contemplated by the present invention that alternative card types may be utilized as long as coupon data may be written to and read from the coupon card 20 in a reliable manner.

The point-of-sale terminal 40 includes a transaction data interface 42 and a coupon card interface 44. The transaction data interface 42 is operative to permit entry, at the point-of-sale, of transaction data, i.e., product code, product price, etc. The point-of-sale coupon card interface 44 includes coupon card reading instrumentation operative to read coupon data written to the coupon card 20 and coupon card writing instrumentation operative to remove coupon data from the coupon card 20. Coupon data is removed from the coupon card 20 depending on the products purchased and coupons used, as represented in the transaction data.

The host computer 50 is in communication with the in-store kiosk 30 and the point-of-sale terminal 40. The coupon data processor 60 is programmed to correlate the transaction data with the coupon data read from the coupon card 20 and to reduce the product sale price by an amount indicated in the coupon data. The step of reducing the product sale price may be made dependent upon receipt of a consumer authorization signal (for example a PIN) at the point-of-sale terminal 40. As is indicated in FIG. 1, the coupon data processor 60 is preferably associated with the host computer 50 or some other centralized system component, but may alternatively be provided at the point-of-sale terminal 40.

According to one aspect of the present invention, the in-store kiosk user interface 32 includes a coupon display operative to display available coupon data. A product filter 52 is provided to enable inclusion of one or more selected categories of available coupon data for display at the user interface 32 in response to entry of inclusion data at the user interface 32. In this manner, a user may designate the number and type of coupons available for selection according to the nature of the products associated with the coupons. Alternatively, the product filter 36 and user interface 32 may be arranged to enable a user to exclude certain types of coupons to limit the number and type of coupons available for selection. For example, as is indicated in FIG. 1, the product filter 52 is preferably associated with the host computer 50 or some other centralized system component, but may be provided at the in-store kiosk 30.

According to another aspect of the present invention, the electronic coupon system 10 further comprises a graphical coupon data storage 54. The coupon data processor 60 is operative to correlate the graphical coupon data with the coupon selection data and to transmit the correlated data to a kiosk printer 36 to enable printing of a graphical coupon selected at the kiosk user interface 32. As is indicated in FIG. 1, the graphical coupon data storage 54 is preferably associated with the host computer 50 or some other centralized system component, but may be provided at the in-store kiosk 30.

According to further aspects of the present invention, the coupon data processor 60 may be programmed to display an attention screen at the user interface 32, wherein the attention screen is indicative of a product promotion. Further, the coupon data processor 60 may be programmed to generate a list of selected coupons and cause the list of selected coupons to be printed at the user interface 32. The electronic coupon system 10 may further comprise a report generator 56 programmed to generate a products-of-interest report listing products for which coupons have been selected but not utilized, i.e., products identified in coupons selected at the user interface but not identified in the transaction data. The report generator 56 may also be programmed to generate a coupons-to-expire report listing coupons on the coupon card 20 set to expire by a predetermined date. Preferably, the coupon data processor 60 is programmed to display the coupons-to-expire report at the user interface 32. Further, the report generator 56 may also be programmed to generate a product tracking report that enables a store operator or a manufacturer to monitor a consumer's choice of coupons selected at the in-store kiosk and actually redeemed at the point of sale.

Figure 2:
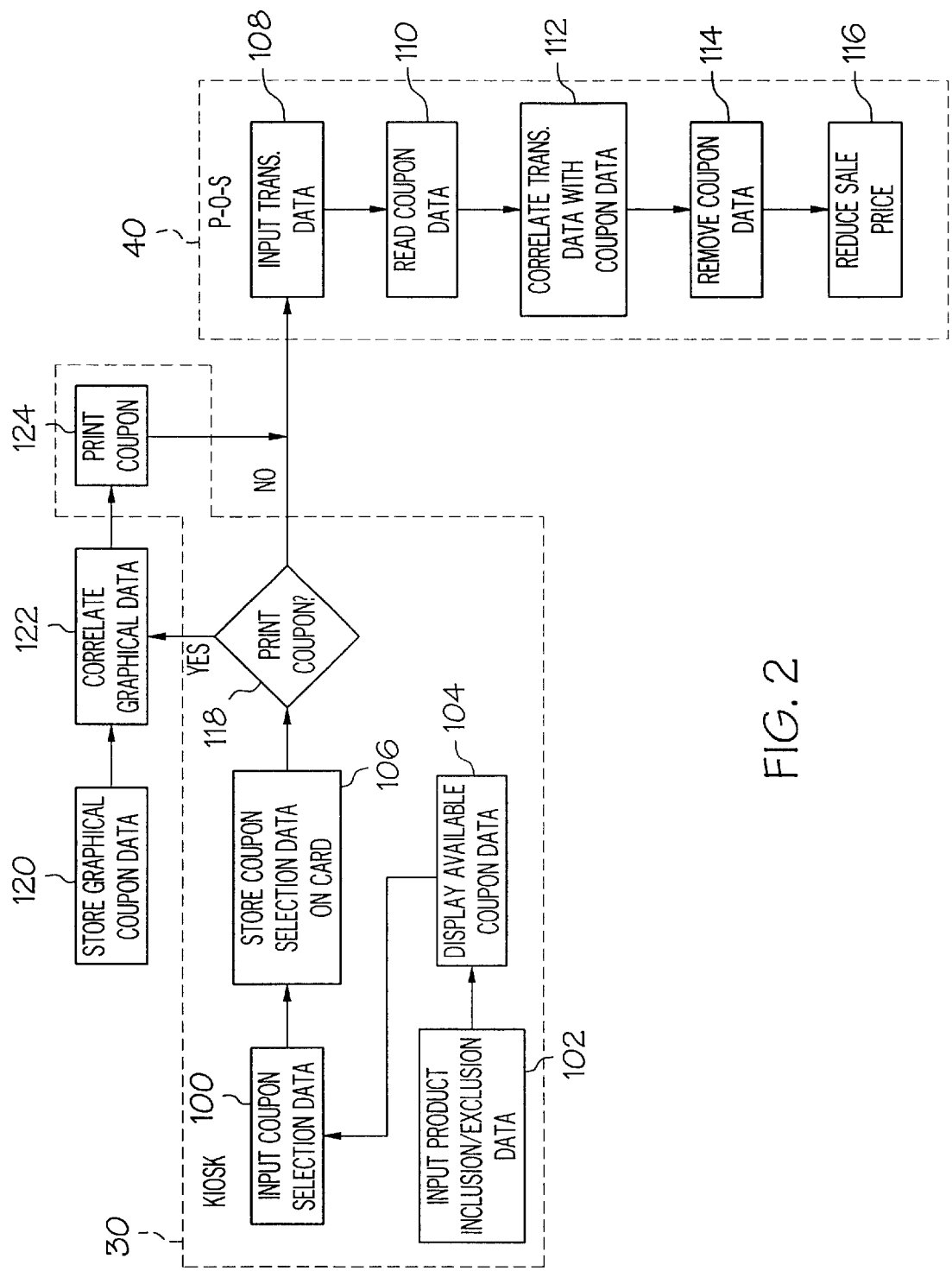
FIG. 2 is a flow chart illustrating a method of processing electronic coupons according to the present invention.

Referring now to FIG. 2, a method of processing electronic coupons according to the present invention is described in detail. Initially, coupon selection data is generated and input at the in-store kiosk 30, see step 100. The coupon selection data may be generated through the use of product inclusion or exclusion data. Specifically, a user may be prompted to input product inclusion or exclusion data at the kiosk 30, see step 102. As a result, in response to entry of product inclusion data, one or more selected categories of available coupon data are displayed at the in-store kiosk 30, see step 104. Similarly, in response to entry of product exclusion data, one or more selected categories of available coupon data are specifically excluded from display at the in-store kiosk 30. The system 10 may be programmed to prompt the user to enter either or both of the product inclusion data and the product exclusion data. Viewing the displayed coupon data, a user is then prompted to select specific coupons and the resulting coupon selection data is stored on the coupon card at the in-store kiosk 30, see step 106.

At the point-of-sale terminal 40, transaction data representative of a product sale are input to the electronic coupon system 10, see step 108. Coupon data written to the coupon card 20 at the in-store kiosk, or elsewhere, is then read at the point-of-sale card interface 44, see step 110. Transaction data is correlated with the coupon data read from the coupon card 20, see step 112, coupon data is removed from the coupon card 20 at the point-of-sale terminal according to the transaction data, see step 114, and the product sale price is reduced by an amount indicated in the coupon data to complete the transaction, see step 116.

In the illustrated embodiment, the steps of storing and reading the coupon selection data are executed via a microprocessor embedded in the coupon card 20. The microprocessor is programmed to store coupon data in the coupon card 20. As is noted above, if a user prefers to have coupons printed at the kiosk 30, see step 118, graphical coupon data stored in the system 10, see step 120, is correlated with the coupon selection data, see step 122, to enable printing of a graphical coupon, see step 124.

It is noted that specific descriptions or identifications of certain computer-related hardware to be utilized in the present invention is not presented in the above description. However, it is contemplated that one of ordinary skill in the art, in light of that which is generally and conventionally known in the art and in light of the above description of the present invention, will be able identify or design suitable computer-related components and, as such, will be able to make, use, and otherwise practice the present invention by utilizing the suitable components. For example, although a specific, commercially available kiosk user interface is not identified in the above description of the present invention, it is contemplated that a plurality of suitable keyboard and display combinations may be utilized in the present invention or, in the alternative, one skilled in the art of user interface design could readily design a keyboard interface for use in practicing the present invention. Having described the invention in detail and by reference to preferred embodiments thereof, it will be apparent that modifications and variations are possible without departing from the scope of the invention defined in the appended claims.

What is claimed is:

1. An electronic coupon system comprising:
   a coupon card;
   an in-store kiosk including
      a user interface including coupon selection instrumentation operative to prompt entry of coupon selection data at said user interface and to record said coupon selection data, and
      a coupon card interface including coupon card writing instrumentation operative to write coupon data to said coupon card according to said coupon selection data and coupon card reading instrumentation operative to read coupon data written to said coupon card;
   a point-of-sale terminal including
      a transaction data interface operative to permit entry of transaction data representative of a product sale and a product sale price, and
      a point-of-sale coupon card interface including coupon card reading instrumentation operative to read coupon data written to said coupon card and coupon card writing instrumentation operative to remove coupon data from said coupon card according to said transaction data;
   a host computer in communication with said in-store kiosk and said point-of-sale terminal;
   a coupon data processor programmed to correlate said transaction data with said coupon data read from said coupon card by said coupon card interface and to reduce said product sale price by an amount indicated in said coupon data; and
   a report generator programmed to generate a products-of-interest report, wherein said products-of-interest report lists products identified in coupons selected at said user interface but not identified in said transaction data.

2. An electronic coupon system comprising:
   a coupon card;
   an in-store kiosk including
      a user interface including coupon selection instrumentation operative to prompt entry of coupon selection data at said user interface and to record said coupon selection data, and a coupon card interface including coupon card writing instrumentation operative to write coupon data to said coupon card according to said coupon selection data and coupon card reading instrumentation operative to read coupon data written to said coupon card;

a point-of-sale terminal including a transaction data interface operative to permit entry of transaction data representative of a product sale and a product sale price, and a point-of-sale coupon card interface including coupon card reading instrumentation operative to read coupon data written to said coupon card and coupon card writing instrumentation operative to remove coupon data from said coupon card according to said transaction data;

a host computer in communication with said in-store kiosk and said point-of-sale terminal;

a coupon data processor programmed to correlate said transaction data with said coupon data read from said coupon card by said coupon card interface and to reduce said product sale price by an amount indicated in said coupon data;

a report generator programmed to generate a coupons-to-expire report, wherein said coupons-to-expire report lists coupons from coupon data written to said coupon card set to expire by a predetermined date.

3. A method of processing electronic coupons comprising the steps of:

inputting coupon selection data generated at an in-store kiosk;

storing said coupon selection data on a coupon card at said in-store kiosk;

inputting transaction data generated at a point-of-sale terminal, wherein said transaction data is representative of a product sale and a product sale price;

reading coupon data written to said coupon card at said point-of-sale terminal;

correlating said transaction data with said coupon data read from said coupon card;

removing coupon data from said coupon card at said point-of-sale terminal according to said transaction data;

reducing said product sale price by an amount indicated in said coupon data; and generating a products-of-interest report listing products identified in said coupon selection data but not identified in said transaction data.

4. A method of processing electronic coupons as claimed in claim 3 further comprising the step of generating a product tracking report that enables monitoring of coupons selected at said in-store kiosk and actually redeemed at said point of sale.

5. A method of processing electronic coupons comprising the steps of:

inputting coupon selection data generated at an in-store kiosk;

storing said coupon selection data on a coupon card at said in-store kiosk;

inputting transaction data generated at a point-of-sale terminal, wherein said transaction data is representative of a product sale and a product sale price;

reading coupon data written to said coupon card at said point-of-sale terminal;

correlating said transaction data with said coupon data read from said coupon card;

removing coupon data from said coupon card at said point-of-sale terminal according to said transaction data;

reducing said product sale price by an amount indicated in said coupon data; and generating a coupons-to-expire report listing products identified in coupon data written to said coupon card and set to expire by a predetermined date.

\* \* \* \* \*

UNITED STATES PATENT AND TRADEMARK OFFICE
CERTIFICATE OF CORRECTION

PATENT NO. : 6,691,915 B1
DATED : February 17, 2004
INVENTOR(S) : Thaxton et al.

It is certified that error appears in the above-identified patent and that said Letters Patent is hereby corrected as shown below:

Title page,
Item [54], Title, "ELECTRONIC COUPON SYSTEM AND METHOD OF PROCESSING ELECTRONIC COUPON CARD FOR STORAGE AND REDEMPTION" should read -- ELECTRONIC COUPON SYSTEM AND METHOD OF PROCESSING ELECTRONIC COUPONS WITH COUPON CARD FOR STORAGE AND REDEMPTION --;
Item [57], ABSTRACT,

(57) "An electronic coupon system and a method of processing electronic coupons are provided utilizing a coupon card on which data representing selected coupons may be stored for subsequent redemption at a point-of-sale terminal. In accordance with one embodiment of the present invention, an electronic coupon system is provided including, a coupon card, an in-store kiosk, a point-of-sale terminal, a host computer, and a coupon data processor. The host computer is in communication with the in-store kiosk and the point-of-sale terminal. The in-store kiosk includes a user interface and a coupon card interface. The point-of-sale terminal includes a transaction data interface and a point-of-sale coupon card interface. The coupon data processor is programmed to correlate the transaction data with the coupon data read from the coupon card by the coupon card interface and to reduce the product sale price by an amount indicated in the coupon data." should read -- An electronic coupon system and a method of processing electronic coupons are provided utilizing a coupon card on which data representing selected coupons may be stored for subsequent redemption at a point-of-sale terminal. In accordance with one embodiment of the present invention, an electronic coupon system is provided including a coupon card, an in-store kiosk, a point-of-sale terminal, a host computer, and a coupon data processor. The host computer is in communication with the in-store kiosk and the point-of-sale terminal. The in-store kiosk includes a user interface and a coupon card interface. The point-of-sale terminal includes a transaction data interface and a point-of-sale coupon card interface. The coupon data processor is programmed to correlate the transaction data with the coupon data read from the coupon card by the coupon card interface and to reduce the product sale price by an amount indicated in the coupon data. --

Column 1,
Line 41, "utilizing: a" should read -- utilizing a --;
Line 67, "transaction" should read -- transaction data. --;

UNITED STATES PATENT AND TRADEMARK OFFICE
CERTIFICATE OF CORRECTION

PATENT NO.     : 6,691,915 B1
DATED          : February 17, 2004
INVENTOR(S)    : Thaxton et al.

It is certified that error appears in the above-identified patent and that said Letters Patent is hereby corrected as shown below:

Column 3,
Line 54, "The FIG. 1" should read -- FIG. 1 --;

Signed and Sealed this

Seventeenth Day of August, 2004

JON W. DUDAS
*Acting Director of the United States Patent and Trademark Office*